United States Patent [19]

Riemenschneider

[11] 3,899,509

[45] Aug. 12, 1975

[54] PROCESS FOR THE MANUFACTURE OF MALEIC ACID IMIDE

[75] Inventor: Wilhelm Riemenschneider, Frankfurt am Main, Germany

[73] Assignee: Hoechst Aktiengesellschaft, Frankfurt am Main, Germany

[22] Filed: Nov. 12, 1970

[21] Appl. No.: 89,056

Related U.S. Application Data

[63] Continuation-in-part of Ser. No. 622,399, March 13, 1967, abandoned.

[30] Foreign Application Priority Data

Mar. 25, 1966 Germany................................ 48773
Dec. 23, 1966 Germany................................ 51057

[52] U.S. Cl....................................... 260/326.5 FM

[51] Int. Cl.$^2$...................................... C07D 207/40
[58] Field of Search............................... 260/326.5

[56] References Cited

UNITED STATES PATENTS 3,397,210    8/1968    Michalowicz.................... 260/326.5

*Primary Examiner*—Henry R. Jiles
*Assistant Examiner*—Bernard I. Dentz
*Attorney, Agent, or Firm*—Curtis, Morris & Safford

[57] ABSTRACT

Continuous, recycle type process for the manufacture of maleic acid imide from maleic anhydride and ammonia by reacting the components in the gaseous phase in the presence of a dehydration catalyst.

5 Claims, No Drawings

PROCESS FOR THE MANUFACTURE OF MALEIC ACID IMIDE

The present application is a continuation-in-part application of application U.S. Ser. No. 622,399, filed Mar. 13, 1967 now abandoned and relates to a process for the manufacture of maleic acid imide from maleic anhydride and ammonia.

More specifically the present invention provides a process for the manufacture of maleic acid imide which comprises reacting maleic anhydride and ammonia in the gaseous phase while passing them over alumina as dehydration catalyst.

Michalowicz (U.S. Pat. No. 3,397,210) describes a process for the production of maleic imide from maleic anhydride and ammonia wherein the components are reacted under a subatmospheric pressure of 1 mm of mercury in a molar ratio of 1:1 in the presence of an acidic $SiO_2$ catalyst containing a small amount of alumina. It is quite obvious that such a process entails considerable drawbacks. Working under highly reduced pressure necessitates apparatus of large dimensions having thick walls. Moreover, expensive pumps are necessary to produce the high vacuum and much energy is required.

The present invention provides a continuous, recycle type process for the manufacture of maleic acid imide from maleic anhydride and ammonia, which comprises reacting maleic anhydride with ammonia in the presence of an inert gaseous diluent at superatmospheric pressure with a substantial molar deficiency of ammonia to maleic anhydride in the presence of an aluminum oxide catalyst and with relatively low conversions per pass in the range of from 5 to 20 %.

The process of the invention, which is carried out under a superatmospheric pressure in the range of from 1.5 to 10 atmospheres absolute, allows of passing considerably higher amounts of reaction components through the reactor per unit of time. Moreover, expensive apparatus and high energy costs, as required in the known process for the production of the high vacuum, can be saved.

To carry out the process of the invention maleic anhydride and ammonia are passed over the catalyst in the gaseous state, preferably not in the mixed state. It has proved particularly advantageous to use a deficiency of ammonia. It has been observed that the yields of maleic acid imide noticeably increase when the molar ratio of ammonia to maleic anhydride is in the range of from 1:3 to 1:12.

When a molar deficiency of ammonia is used, the formation of by-products, for example maleic acid monoamide and/or the ammonium salt of said acid is distinctly reduced as can be seen in the table summarizing the results of example 2 to 8. This fact facilitates the further working up and the distillation to obtain pure maleic imide.

In contradistinction thereto, equimolecular amounts of the reactants are used in the known process. The conversions obtained in this process amount to 64 %, calculated on maleic anhydride, but the remainder of 36 % obviously consists of undesired byproducts which can no longer be used in the reaction and of combustion losses.

These are the reasons why the conversion rates in the process of the invention are kept low, in the range of from 5 to 20 %, preferably 8 to 14 %, per pass through the reactor, calculated on maleic anhydride used. The unreacted starting components are recycled at once into the reactor. In this manner yields over 70 % of maleic imide can be obtained, calculated on maleic anhydride, while the losses are kept very low.

The molar ratio of ammonia to maleic anhydride of 1:12 does not represent an absolute limit. The yield can be further increased with mixtures containing a still smaller amount of ammonia, but in this case the conversion rate, calculated on the maleic anhydride, is so low owing to the small amount of ammonia that the process may become uneconomical.

The reaction is especially advantageous when an inert gaseous diluent is used, for example nitrogen, air or hydrocarbons that are gaseous under the reaction conditions, such as methane, gasolines or benzene. Prior to the reaction the inert gas is advantageously added to one of the reactants, suitably the maleic anhydride. In contrast thereto, no diluent is used in the known process.

The reaction temperatures depend on the activity of the catalyst. They are preferably in the range of from 100° to 400°C, more preferably 150° to 250°C. It is likewise possible, however, to operate at a temperature below 100°C or above 400°C.

The reaction is carried out at superatmospheric pressure, for example under a pressure from 1.5 to 10 atmospheres absolute.

The residence times can vary within wide limits, those of 0.1 to 0.5 second being preferred.

The gas mixture leaving the reaction zone is cooled so that the reaction components can be separated in the solid or liquid state, especially when inert gases are concomitantly used and depending on the type of cooling. Alternatively, the reaction gas mixture can be freed from the reaction components by washing, if desired after previous cooling. Suitable washing agents are water or organic solvents, for example benzene or ethyl acetate.

The inert gas which has been wholly or substantially freed from the starting components and the final products can be recycled to the reaction zone.

The maleic acid imide separated in the liquid or solid state or in the form of a solution still contains part of unreacted maleic anhydride. The maleic acid imide can be isolated in pure form in usual manner, for example by distillation, sublimation or extraction. Unreacted maleic anhydride, which has been separated, for example by distillation, is reconducted into the reaction zone.

According to a preferred mode of execution of the process of the invention a mixture containing maleic anhydride is used instead of pure maleic anhydride, which mixture originates from a maleic anhydride synthesis. Especially suitable are mixtures obtained in the oxidation of appropriate hydrocarbons such as, for example, benzene or $C_4$-hydrocarbons, or in the oxidation of croton aldehyde. After having been mixed with ammonia, the said reaction gases are passed over the dehydration catalyst.

Maleic acid imide constitutes an intermediate for organic syntheses and can be used as monomer or comonomer in the manufacture of polymers. The nitrogen group confers upon the polymers special properties, for example an improved dyeability and thermal stability under load. Maleic acid imide can furthermore be used in the control of pests, for example for killing insects.

Moreover, it has a bactericidal effect and inhibits the growth of cells.

The following examples serve to illustrate the invention.

EXAMPLE 1 (Comparative Example)

A glass tube having a diameter of 25 millimeters and charged with 130 milliliters of granules of $Al_2O_3$ having a diameter of 3 to 5 millimeters was placed in a furnace with electric heating. At an internal temperature of 200°C in the catalyst, the following substances were passed per hour through the furnace at a pressure of 1.8 atmospheres absolute:

a. 2 cubic meters (measured at normal conditions of pressure and temperature) of nitrogen preheated at 140°C,
b. 49 grams (½ mole) of maleic anhydride dropped into the hot nitrogen current and
c. 12 liters of ammonia (about ½ mole).

The gases leaving the furnace were cooled in stages, first to 65°C and then to 20°C, and washed with water in a wash tower. After an operating time of 2 hours the gas currents were switched off and the condensers were heated with steam, whereupon the reaction product melted and flowed out. It was distilled under a pressure of 10 to 12 mm of mercury. The first runnings consisted of 77 grams of maleic anhydride. As main product 11.2 grams of maleic acid imide (boiling point 120°–125°C under 10 mm Hg; melting point 92°–93°C) corresponding to a conversion of 11.5 % and an overall yield of 54 % of the theoretical, calculated on maleic anhydride reacted, were obtained, while the yield per pass, calculated on maleic anhydride fed, ammounted to 6.3 %.

EXAMPLES 2 to 8

The furnace described in Example 1 was used. The reaction was carried out at an internal temperature of 220°C. Maleic anhydride (MA) was dropped into the nitrogen current of 2 cubic meters per hour preheated at 140°C and passed in the gaseous state over the catalyst together with ammonia at a pressure of 1.8 atmospheres absolute. The gases leaving the furnace were gradually cooled to −10°C. When the operation was terminated, the product was removed by melting and distilled under reduced pressure. Maleic anhydride passed at 57°–58°C under a pressure of 5 mm of mercury. Various experiments were carried out under identical conditions, but with different amounts of gases. The results of Examples 1 to 8 are summarized in the following table which illustrates the dependency of the conversion and the yield on the molar ratio of ammonia to maleic anhydride.

| Ex. | MA mole/hr | $NH_3$ mole/hr | molar ratio $NH_3$:MA | conversion calculated on MA reacted | yield per pass calcul. on MA fed | overall yield calculated on MA reacted |
|---|---|---|---|---|---|---|
| 1 | 0.5 | 0.5 | 1 : 1 | 11.5 % | 6.3 % | 54.0 % |
| 2 | 0.5 | 0.25 | 1 : 2 | 13.3 % | 7.5 % | 56.1 % |
| 3 | 0.5 | 0.125 | 1 : 4 | 14.8 % | 8.6 % | 57.8 % |
| 4 | 0.5 | 0.084 | 1 : 6 | 12.8 % | 8.2 % | 60.4 % |
| 5 | 0.8 | 0.133 | 1 : 6 | 11.8 % | 7.1 % | 60.2 % |
| 6 | 0.8 | 0.10 | 1 : 8 | 12.3 % | 7.8 % | 63.8 % |
| 7 | 0.8 | 0.086 | 1 : 9.3 | 10.5 % | 7.1 % | 67.5 % |
| 8 | 0.8 | 0.067 | 1 : 12 | 8.5 % | 6.0 % | 70.2 % |

What is claimed is:

1. A continuous, recycle type gas phase process for the manufacture of maleic acid imide from maleic anhydride and ammonia which comprises reacting maleic anhydride with ammonia in the presence of an inert gaseous diluent at superatmospheric pressure with a substantial molar deficiency of ammonia to maleic anhydride in the presence of an aluminum oxide catalyst and with relatively low conversions per pass in the range of from 5 to 20 %.

2. A continuous, gas phase process for the manufacture of maleic acid from maleic anhydride and ammonia comprising the steps of: introducing ammonia and maleic anhydride to a reaction zone together with a recycle stream containing unreacted maleic anhydride, said ammonia being presented in such amount as to maintain a substantial molar deficiency of ammonia relative to maleic anhydride; reacting said maleic anhydride and ammonia in said reaction zone over an aluminum oxide catalyst at a pressure of from 1.5 to 10 atmospheres absolute, at a temperature of from 100°C to 400°C and at a per pass conversion of maleic anhydride of 5 to 20%; and separating unreacted maleic anhydride from the mixture formed in the reaction zone and recycling it to said reaction zone.

3. The process of claim 2, wherein the molar ratio of ammonia to maleic anhydride is in the range of from 1:3 to 1:12.

4. The process of claim 2, wherein the conversion per pass is in the range of from 8 to 15%.

5. The process of claim 2, wherein, instead of pure maleic anhydride, a gas mixture containing maleic anhydride is used which is obtained in the oxidation of benzene or of $C_4$-hydrocarbons or of crotonaldehyde.

* * * * *